UNITED STATES PATENT OFFICE.

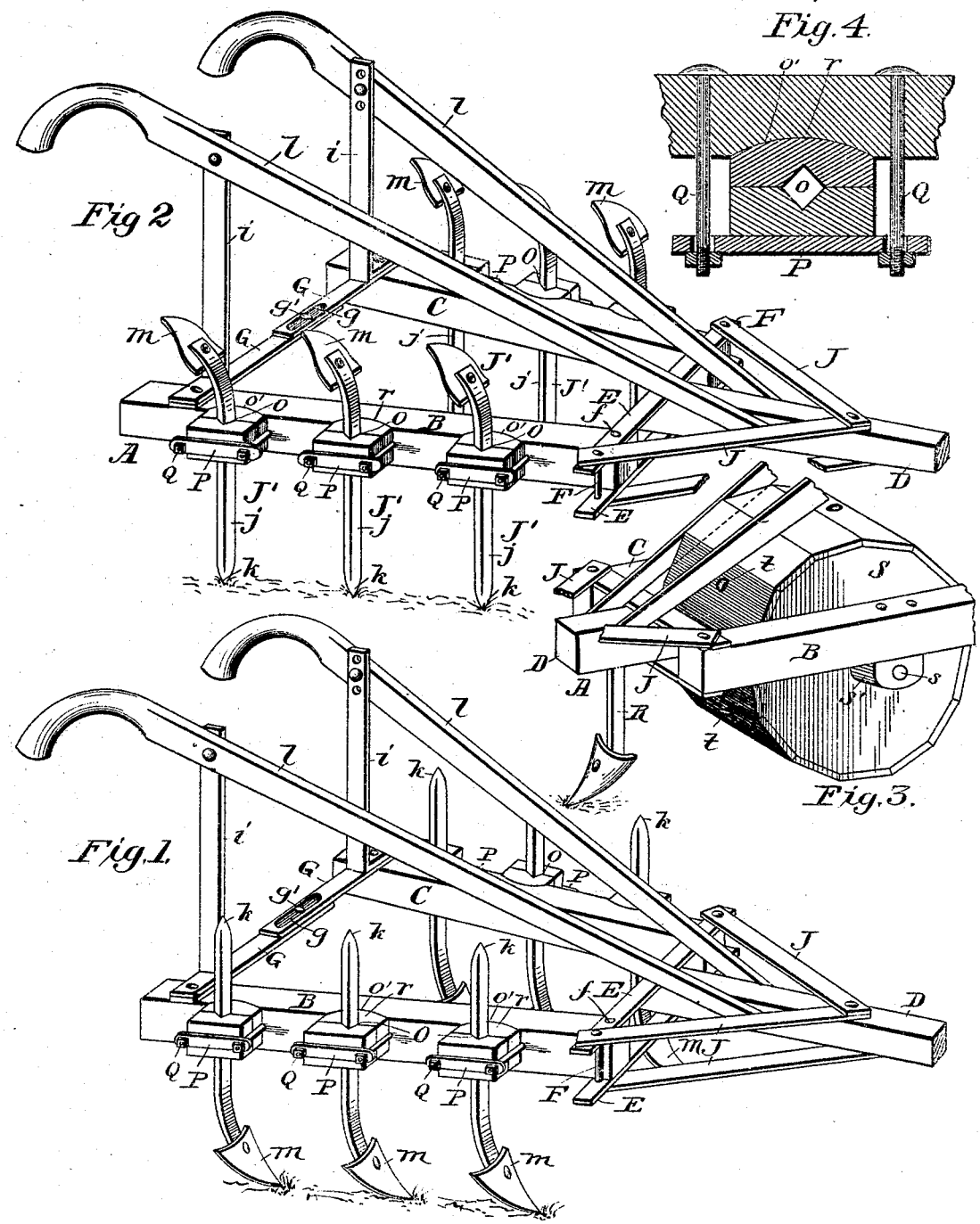

GEORGE W. RANDOLPH, OF MEMPHIS, TENNESSEE, ASSIGNOR OF ONE-HALF TO JAMES M. SMITH, OF SAME PLACE.

CULTIVATOR, HARROW, AND COTTON-PLANTER.

SPECIFICATION forming part of Letters Patent No. 509,826, dated November 28, 1893.

Application filed June 8, 1893. Serial No. 477,021. (No model.)

*To all whom it may concern:*

Be it known that I, GEORGE W. RANDOLPH, a citizen of the United States, residing at Memphis, in the county of Shelby and State of Tennessee, have invented certain new and useful Improvements in Cultivator, Harrow, and Cotton-Planter; and I do hereby declare the following to be a full, clear, and exact description of the invention, such as will enable others skilled in the art to which it appertains to make and use the same.

My present invention is a combined cultivator, harrow and cotton planter which is so constructed as to enable the implement to be readily and quickly converted or changed from a cultivator to a harrow, or to a cotton planter, thus producing a simple and cheap implement which can be adapted to the various uses required by a farmer in planting and cultivating a cotton crop.

The special feature of the present invention resides in the improved construction of the cultivator and harrow teeth and the means for clamping the same to the frame of the implement, and the object in view is to enable the combined cultivator and harrow teeth to be reversed end for end to serve either as a cultivator or as a harrow, and to provide for the necessary adjustment of the cultivator teeth with reference to their angular position to the line of draft, and also to enable different sizes of teeth to be securely clamped or affixed to the frame of the implement.

With these ends in view, the invention consists primarily in the combination with a bar or beam of a frame having a recess or concavity in one side thereof, of a support constructed with a socket for the shank of the tooth and with a convex side adapted to the concavity or recess in the bar or beam, a clamping plate bearing against a flat or straight side of the support, and bolts fixed to the bar or beam and passing through holes in the clamping plate to receive nuts which can be adjusted to vary the position of the support and the shank of the tooth relative to the bar or beam so that the angular position of the tooth to the draft can be changed.

The improvements further consist in making the tooth support in sections, each of which has a V shaped diamond recess on its inner side, and when the sections are properly fitted together, these recesses coincide to form the polygonal socket for the tooth-shank and are adapted to receive shanks of different sizes, combined with the beam and clamping plate between which the sections of the support are clamped, and the bolt connected to the plate and to the beam to hold the sections of the support together.

The invention finally consists in the peculiar construction and combination of parts which will be hereinafter more fully described and particularly pointed out in the claims.

The accompanying drawings, forming a part of this specification, fully illustrate my improvements, in which—

Figure 1 is a perspective view of the implement adjusted for service as a cultivator. Fig. 2 is a like view showing the implement having the teeth adjusted for service as a harrow. Fig. 3 is a view showing the rolling hopper adapted for planting cotton seed, and Fig. 4 is an enlarged detail sectional view through the means for clamping the teeth to the frame.

Like letters of reference denote corresponding parts in all the figures of the drawings, referring to which—

A designates the frame of my implement which is designed to support the cultivator and harrow teeth or the cotton seed drum, and to be adjusted to adapt the implement to a parallel cultivator or to a V harrow. This frame has the two side beams B, C, and D is the draft beam which is arranged in the central line of the implement and has its rear end terminating between the front ends of the two side beams.

To the rear end of the draft beam are rigidly secured the transverse bars E, E, which are arranged to bear against the upper and lower sides of the draft beam, by means of the bolts, e, e and these bars E, E, extend at right angles across the draft beam. The outer ends of the bars E, E, are provided with a series of vertical bolt holes $f, f$, and through these aligned openings are passed the vertical bolts F, F, which also pass through the front ends of the side beams B, C, thus connecting the front ends of the side beams to the rear part of the draft beam by the bars E, E. These bolts and the front ends of the side beams can be adjusted or moved between the bars E, E, toward or from the rear end of the draft beam, and thus the width of the frame can be varied at the front part thereof. The rear ends of the side beams are coupled together by the bars G, each of which is slotted nearly its entire length, as at g; and the inner lapped parts of these slotted bars are connected by the vertical bolt g' which holds the bars rigidly together but which can be loosened to permit the bars to extend longitudinally with respect to each other. The outer ends of the slotted bars are connected to the rear ends of the side beams by suitable bolts.

l l are the handles of the implement which are rigidly secured at their lower front ends to the draft beam in advance of the transverse bars E, and these handles are braced by the standards i which are adjustably connected at their upper ends to the handles, each standard having a slotted foot which is bolted to the side beam of the frame A. The front ends of the side beams are braced by the inclined stays J, which have their front ends secured to the draft beam by a common bolt while the rear ends of the stays are secured to the bars E or to the side beams B, C, by suitable bolts.

In my implement I use a series of reversible teeth J on each side beam of the frame. Each tooth J is formed to present a harrow point at one end and a cultivator shovel at the opposite end, and each tooth is reversible end for end to adapt the implement for service either as a harrow or as a cultivator by the use of a single set of teeth. Each tooth consists of a long shank or bar j, polygonal in cross section, and at one end the shank or bar is pointed to form the harrow point k and its other end is flattened and formed with a seat on which is fitted the point or shovel m that is fastened to the flattened end of the shank or bar by means of the through bolt that passes through the shovel or point and the flattened end of the shank or bar. These reversible teeth are clamped to the side beams of the implement by the clamp of novel construction shown by the detail view Fig. 4 of the drawings. The polygonal shank is fitted in a polygonal opening or socket o formed in the support or block O, and this block or support is held or confined between the side beam of the frame and a clamping plate P which is held against the support by the bolts Q, Q. To adapt the support or block which sustains the tooth to be adjusted at an angle with reference to the line of the beam and thereby enable the tooth to be held at different angles to the line of the draft, I form the beam or bar and the block O so that the latter can be shifted or changed by turning up one nut more than the other on the bolts Q, Q.

In one side of the bar or beam B or C, is formed a curved recess or concavity r, and the side of the block O adjacent to the beam is made convex at o' to conform to the shape of the recess r so that the block or support can fit snugly in the concavity and be free to oscillate or turn therein for a limited distance. The block or support O is made in two pieces or sections, each of which has a recess formed on the inner face thereof, which recesses are designed to coincide and form the polygonal socket or opening o to receive the tooth-shank; and these sections of the block O are adapted to be firmly drawn upon the tooth-shank by means of the clamping plate P and the bolts Q, Q, the latter being fastened to the bar or beam on opposite sides of the block O and passing through enlarged holes near the ends of the plate to receive the adjusting nuts q, q.

The sectional block O is designed to receive teeth of different diameters and to firmly clamp the teeth between its section; and this block can be shifted to change its position relative to the line of the beam by turning up one nut on its bolt and letting the other nut out on its bolt so that the plate P will incline relative to the beam and thus the position of the tooth to the line of draft can be changed. This adjustability of the support or block O is important when the implement is adjusted for service as a cultivator as the tooth can then be brought to the proper position to secure the best results, but when the implement is adjusted as a harrow it is not important that the blocks shall incline relative to the bars or beams of the frame.

When the implement is used as a harrow, the front ends of the side bars are moved inward toward the draft beam and held by the bolts to provide a V frame, and the teeth J are all adjusted so that the harrow points thereof will scrape the ground. As a cultivator, the beams B, C, are adjusted into positions substantially parallel with each other, and the teeth J are reversed to cause the shovels or points thereon to contact with the ground. If desired, the teeth may be arranged on opposite sides of the bar or beam or alternate with each other to secure greater space between the teeth; thus the first tooth be on the right hand side of the beam, the second on the left hand side of the beam, the third on the right hand, or the order may be reversed. A middle plow or stock R may be secured to the draft beam in advance of the side stocks or teeth, and it may be braced by a suitable stay designed to be fastened to the beam and to the stock. The reversal of the teeth J can be easily effected as it is only necessary to loosen the nuts on the bolts, Q, pull out the support O and remove it from the tooth-shank, then reverse the shank and replace the support between the plate and beam, after which the nuts are tightened up on the bolts.

The frame A constructed as herein described also provides a convenient means for the support of the rolling hopper when the implement is used for planting cotton seed. The hopper is shown in Fig. 3 of the drawings, and it consists of the drum S which is arranged between the side beams B, C, of the frame and in rear of the draft beam. The drum is carried by a shaft s which is journaled at its ends in bearings s' bolted to the under side of the side beams. This shaft carries a series of agitator fingers not shown which are arranged within the drum and serve to keep the cotton seed therein from clogging. The drum is composed of two heads and a series of transverse pieces secured to the heads; and through these transverse pieces are pierced the holes t which can be opened or closed by any suitable form of regulating valve.

The operation and advantages of my invention will be readily understood and appreciated by those skilled in the art from the foregoing description taken in connection with the drawings.

I am aware that changes in the form and proportion of parts and details of construction of the mechanism herein shown and described as an embodiment of my invention can be made without departing from the spirit or sacrificing the advantages of the invention and I therefore reserve the right to make such changes and alterations as fairly fall within the scope of the invention.

What I claim as new is—

1. The combination of a recessed beam, the sectional block having a curved side adapted to the recess in the beam and provided with a socket or opening to receive the tooth, a clamping plate fitted against the outside of the support or block, and the bolts fixed to the beam and having the nuts which bear against the clamping plate, substantially as described.

2. The combination with a beam, of an invertible tooth provided with a harrow point at one end and carrying a shovel at its opposite end, a sectional support between the members of which the tooth is clamped, and the connected plate and bolts by which the sectional support is clamped upon the tooth and the support itself is adjustably held against the beam, substantially as and for the purposes described.

3. The combination with a beam, of an invertible tooth constructed with a harrow point at one extremity and carrying a shovel at its other end, the sectional block O having the coincident grooves forming the socket for said tooth, the clamping plate P fitted against the outer section of said block, and the bolts with adjusting nuts connected to the beam and said clamping plate, whereby the block is confined between said plate and beam and the tooth is held between the sections of the block, as set forth.

In testimony whereof I affix my signature in presence of two witnesses.

GEORGE W. RANDOLPH.

Witnesses:
JNO. JOHNSON,
THOS. F. BAILEY.